United States Patent [19]
Constantin et al.

[11] 3,930,088
[45] Dec. 30, 1975

[54] DECORATIVE MATERIAL

[75] Inventors: Gurgui N. Constantin; Vasile Luca; Andras Eckardt; Paraschiv I. Ciulacu, all of Bucharest, Romania

[73] Assignee: Intreprinderea "Bucuresti" Pentru Extragerea, Prelucrarea si Montarea Marmurei si Pietrei de Constructii, Bucharest, Romania

[22] Filed: Jan. 27, 1972

[21] Appl. No.: 221,467

Related U.S. Application Data

[62] Division of Ser. No. 791,405, Jan. 15, 1969, Pat. No. 3,705,830.

[30] Foreign Application Priority Data

Jan. 20, 1968  Romania.............................. 55669

[52] U.S. Cl. ................ 428/143; 428/237; 428/240; 428/323
[51] Int. Cl.² ...................... B32B 5/16; B32B 19/04
[58] Field of Search ........... 161/83, 87, 89, 94, 111, 161/114, 162, 164, 167; 156/62.2, 278, 279, 280, 298

[56] References Cited
UNITED STATES PATENTS

| | | | |
|---|---|---|---|
| 293,491 | 2/1884 | Miner .................................. | 161/83 |
| 490,668 | 1/1893 | Lee ...................................... | 161/87 |
| 1,183,165 | 5/1916 | Cameron et al. .................... | 161/162 |
| 1,354,025 | 9/1920 | Coryell .............................. | 161/162 |
| 1,436,914 | 11/1922 | Seigle................................. | 161/83 |
| 2,284,716 | 6/1942 | Benner et al. ....................... | 161/162 |
| 3,097,080 | 7/1963 | Weir.................................... | 161/162 |
| 3,171,772 | 3/1965 | Lomar et al. ........................ | 161/89 |
| 3,272,683 | 9/1966 | Marcus et al....................... | 161/164 |
| 3,578,550 | 5/1971 | Hoerner et al...................... | 161/164 |

*Primary Examiner*—Caleb Weston
*Attorney, Agent, or Firm*—Karl F. Ross; Herbert Dubno

[57] ABSTRACT

The invention concerns a new material for the finishing and decoration of the buildings, as well as a process and an installation for the manufacture of same.

The material is a fully processed veneer, having the appearance of a split natural crystalline stone, or of something similar, in the shape of prefabricated flexible sheets (wrapped in rolls). It consists of: (a) a face layer, a sheet of hard granules, from rocks (natural granules, or resulting from crushing) or artificial granules, in 2–3 layers; (b) a binder, consisting of thermoplastic synthetic resins, binding the granules of the sheet to each other by means of a film which is practically invisible, and (c) a bearing layer at the bottom, namely a textile (fillerized) or metallic net, or else a glass felt of large mesh, into which the corners of the granules penetrate. The material is applied as a veneer to the components of the building (in the shape of long flexible sheets, or of cut plates, possibly unyielding) by means of a mortar of hydraulic binders (cement, cement and lime), with additives.

For decorative purposes, the granules of the layer may be disposed in strips of various widths, being of the same kind or different, of the same color or different, previously mixed or distributed unmixed, according to a preestablished geometry.

In the manufacturing process, preferably a continuous process, the supporting net — primed and wet, when of textile material — is in horizontal motion, and the resin and fine padding of granules material is applied, the operations consisting mainly in: spreading the layer of hard dry granules by free flow in a layer of uniform thickness; lightly pressing the layer in order to compact it; binding the granules to each other and to the supporting net by spraying onto it from above a thermoplastic polymer in aqueous dispersion or solution; drying the sprayed binder by evaporating the water or the solvent by progressive and moderate heating from below by means of infrared rays until the binder is slightly weakened, while the foil of material is driven on a conveyor belt; detaching the foil from the conveyor belt; pressing the hot foil between two smooth rolls; cooling the foil down to room temperature the bottom layer is in contact with an even and smooth water cooled metal surface; and cooling the top layer by tangentially blowing thereon an air stream in a direction opposite to the displacement of the foil. Finally, the material is processed in rolls, of convenient size for being stored, conveyed and manipulated when applied.

5 Claims, 6 Drawing Figures

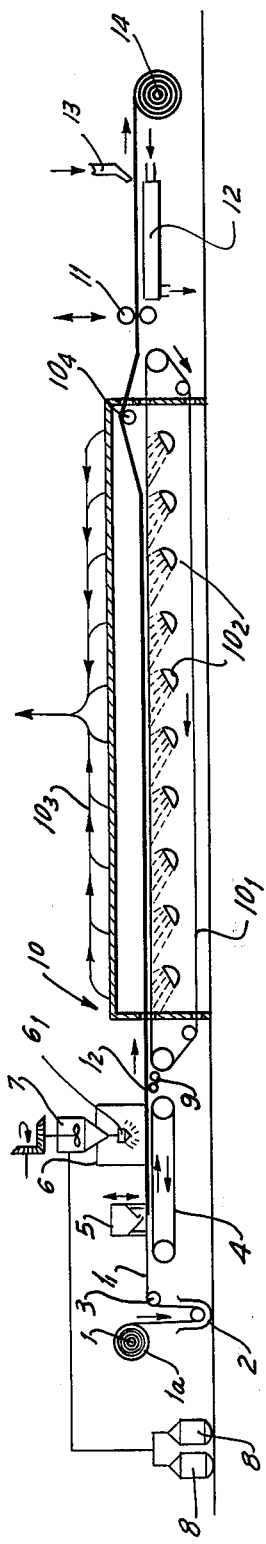
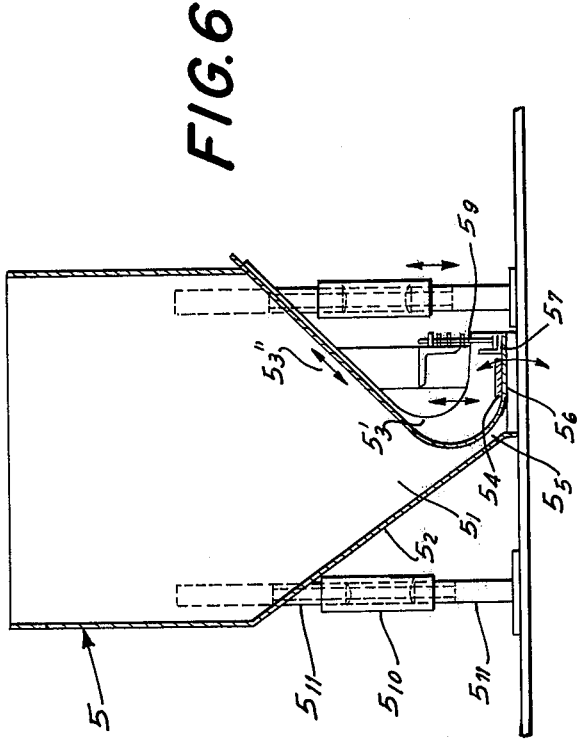

DECORATIVE MATERIAL

This is a division of application Ser. No. 791,405, filed Jan. 15, 1969, now U.S. Pat. No. 3,705,830.

SPECIFICATION

1. Field of the Invention

The invention concerns a prefabricated material for the finishing and the decoration of the buildings as well as a process and an installation for its manufacture.

2. Background of the Invention

For the purpose of finishing and decorating the buildings, tapestry has been suggested which, unlike the old tapestry of paper or textile material, consists of a support of paper or conventional textile material covered by a decorative layer applied in the form of a paste. The paste consists of various binders and filling material, made of natural or artificial matter, ground to a fine grain size or to dust and applied by means of simple rakes or of special brushes. Due to the dusty character of the filler, these layers have not succeeded in assuming the decorative aspect of the natural materials, from which the dusty filler was derived. That is why recently, prefabricated finishing materials in the shape of flexible foils and plates have been proposed, these comprising a support of textiles or of glass felt, covered by a layer of plaster made of a binder of synthetic resins and small or greater granules, arranged in narrow dimensional ranges, applied mechanically. To fix the foil, the back side of the support is covered with a layer of "fillerized" binder, which is attached to the components of the building by means of a cement mortar, with an addition of binders of polymers, emulsifiable in water. The face layer of the sheet of material is opacified, and does not show clearly the grains; the structure and the optical aspect of the natural materials employed for the paste are greatly modified. Moreover, the paste or the mortar require large quantities of binder, thereby making for high prices.

During the last two decades many other prefabricated dry materials have been suggested for the finishing and decoration of buildings. Material consisting of one sheet of elastomer, with expanding additives, covered by a wear-out layer of rubber, colored or possibly offset, treated in a furnace for the purpose of expanding or of vulcanizing the wear-out layer, which is a material of poor decorative effect and may be practically employed only for flooring. In a similar material, the lower layer consists of expanded plastics. Another material suggested applies on a bearing layer made of jute or sewn felt, a layer of expanded polyvinyl chloride, and over it a thin wear-out layer of polyvinyl chloride, colored or slightly embossed. All these materials, which may be used indoors, especially for flooring, consist essentially of plastics and keep the artificial aspects of the latter.

Instead of the old and new types of mosaic for floors and walls, manufactured manually, at high costs, from bigger or smaller flat parts (the so called "Kleinmosaik"), assembled by means of wet mortar, finishings and decorations made of mosaic foils, have been suggested, with small bits of artificial stone, glass, metal, ceramics, plastics, prefabricated foils, flexible and dry. They consist of a layer of flat components of the same kind, color etc., or different, fixed together by filling the space between them and by means of a connecting layer made of the thermoplastic polymers, attached to a support of asbestos felt, impregnated with thermoplastic polymer, plastified and fillerized. For fastening, thermoplastic polymers and copolymers of polyvinyl chloride, copolymers of vinylidene chloride are employed, as well as mixtures of the above, the impregnation is performed with acrylic polymer with additives.

A material suggested for finishing and for decoration, as an artificial stone, consists of a relatively thin support-sheet of non-solidified synthetic resin, into which greater granules (bits) of crushed rock are partially thrust; the support is then solidified and fixes the granules, which are ground with flat facettes, partially, or down to the support level; in one version, the spaces between the great thrusted granules are filled with smaller granules, in the shape of a paste with binder of synthetic resin or an inorganic one, the whole surface being then ground, flat or corrugated, after solidification; in another version, the support is translucent, of adequate thickness, and has larger granules thrusted in it, so that the foil may be applied with either face towards the support, the granules being visible, either directly or by transparence. The foils keep the aspect of artificial material, deriving from the visible support or plastic binder, and are rather expensive, due both to the prime materials and the high production costs.

OBJECT OF THE INVENTION

The present invention is to provide a new material for the finishing and the decoration of buildings, which eliminates the drawbacks of known materials for this purpose, and a process and an installation adequate for producing this material.

SUMMARY OF THE INVENTION

The material for the finishing and the decoration of buildings, according to the invention, is a ready finished veneer, having the appearance of a split natural crystalline stone, or else a similar appearance, in the shape of flexible, prefabricated foils, and consists of an upper layer, screening the further layers, made of a sheet of hard granules, of rock or artifical stone, a binder of synthetic resins connecting the granules of the sheet to each other, being still invisible, as well as of a bottom layer, in the shape of a net, the meshes of which are traversed by the points of the hard granules, so that the foil of material may be applied with the back directly to the components of the building, and being able to adhere directly and to be interpenetrated by the usual binders, eventually with the help of additives. The binders are, of preference, cement-mortar, cement and lime mortar plain or with additives, as for instance synthetic resins, which may be dispersed in water.

As hard granules, bits of rock, in random sizes or crushed, raw or polished, are employed, being sorted in ranges of adequate size of 0,5–5 mm, the dust being removed by washing.

Granules, generally resistant to atmospheric agents, are employed, consisting for instance of the following:

crystalline sedimentary-metamorphic rocks, such as marble or alabaster, white or else naturally or artificially, colored, gneiss, various shales, quartzites and the like;

eruptive volcanic rocks, such as granites, porphyry, sienites, feldspars, quartz, jasper, silex, tuff, trachytes and the like.

Adequate granules of any convenient artificial materials may be employed, such as silicon carbide, glass granules, transparent or opaque, colorless or colored, as inorganic materials; equally, granules of hard plastics, such as polystyrene, polyvinyl chloride, acrylates etc., preferably colored and opacified.

As mentioned, the face layer, consisting of granules, masks completely all that is behind it, that is the supporting net and the binder for applying the material to the components of the building. This is achieved by composing the face layer of more than one single layer of granules, i.e. up to 2–3 layers.

The ranges of granules used in the successive layers may be relatively narrow, such as 1–2; 2–3; 3–4 mm, or else larger, such as 0,5–2; 1–4; 1,5–5 mm; possibly, the proportion of the various ranges may be fixed, according to the decorative effect pursued.

It is obvious that, for the same decorative purpose, the granules constituting the layer may be of the same kind, or else of various kinds, of the same color, or of various colors, conveniently mixed beforehand and distributed in the same manner in constituting the layer, or else distributed unmixed, according to a predetermined geometry.

The practically invisible binder, which connects the granules to each other and to the supporting net, is applied so as to cover with pellicles the whole surface of the layer granules, and to connect them to each other in the nonexposed contact zones, as well as to the supporting net. The apparent layer thus becomes a "conglomerate" of granules, practically invisibly bound, which keeps the appearance and the natural contours of the granules, the natural stone appearance of the foil, in the case of granules from rocks, or else a similar aspect, in the case of granules consisting of artificial materials.

Hardened synthetic resins are employed as the binder, to which both the granules and the supporting net adhere, as well as current binders for applying the foils to the components of the building, of preference cement mortar, alone or mixed with lime and with binders of synthetic resins, as additives.

On the other hand, the hardened synthetic resins, used as binders may be thermoplastic, in order to correspond to the process of manufacturing the material, as described further below.

As synthetic resins, corresponding to these conditions, vinylic polymers and copolymers are used of preference, such as polyvinyl acetates acrylic polymers, such as methyl polymethacrylate, epoxidic polymers, in the form of aqueous dispersions, ensuring a better adhesion, with mineral supports, or in solutions in one or more solvents which are cheap, non-inflamable, non-toxic.

These synthetic resins are employed unfillerized and uncoloured, so that they supply transparent, colorless films, which are invisible in the granule layer, even in deeper layers.

It was further ascertained that the pellicles resulting from the binder and the above synthetic resins - used in the shape of dispersions - are sufficiently water resistant. They swell slightly, but when dried, recover the initial resistance.

In order to avoid the alteration of the face layer, by water spraying and repeatedly drying afterwards, the layer is rendered water-repellent by spraying with a solution of the same polymer, or of another perfectly adhering to it. This operation may be performed during the manufacture of the material, or else after applying it to the components of the building.

The supporting net, which constitutes the back face of the foil, is necessary during the manufacturing process, as well as during the manipulation and the application of the foil. Thus, the meshes of the net must be of such dimensions, that their area should represent at least 70–80% of the total area, while their stable dimensions should not exceed about 70–80% of the lower dimensional limits of the hard granules employed.

Thus, the supporting net is able to bear the granules spread over it, part of which penetrate with their spikes, in the meshes, a fact which helps in making the material firmly adherent to the components of the building.

Net-shaped supports made of textile materials may be employed, such as knitting with constant-size meshes; for the sake of adhesion, and against a possible decay, these textile supports are bibulous and impregnated with aqueous dispersions of the synthetic resin, or else with the synthetic resin solution employed as a binder. For the same purpose, the emulsion of the solution is fillerized by means of dust below 0.5 mm of a materials constituting the hard granules employed.

Supports of steel-wire screen, may equally be employed, the wire being protected by zinc plating or by varnishing with plastics. Glass felt may also be used, of large meshes, together with unwoven-fibers mats, like that used for reinforcing the plastics plates for roofs.

The support may be used in the shape of endless, or nearly endless, broad strips, a fact which constitutes an advantage, both in the manufacturing process, and in manipulation and positioning.

Thus, a foil of finishing and decorative material according to the invention may have a length, of, for instance, 5–20 m.

Due to its structure, the foil of material is sufficiently flexible, to be wrapped around rolls of 10–15 cm dia, a fact which largely ensures the possibility to transport the rolls, to unfold them for the purpose of applying the foil in the shape of long strips, on the components of the building, either in the manufacturing width or as a strip of smaller width, cut out of the whole width.

It is of course possible to apply the material according to the invention, in the form of plates of regular geometric shape, square etc., cut out of the foil, and namely plates of the same structure and colour, or else different, corresponding to the decorative needs. For such purposes, the material may of course be inflexible.

The firm adhesion of the material in the shape of foils or plates, to the components of the building, is favoured by the roughness and the greater area of the granule corners, which penetrate through the meshes of the support, as compared to the small area of the support itself, in contact with the adhesive mortar employed for the application; another factor favouring the adhesion is the foil structure, which allows the binder to penetrate between the granules of the sheet.

A formula for the adhesive mortar with additives, which may be employed for this purpose, is the following: cement of high initial resistance (fast setting strength) 1.5 parts; fine, dry sand of 0–0.2 mm grain size 2 parts; lime paste 50%, the balance being water, 0.10 parts; solid calcium chloride 0.01 parts; mineral dye of the hard-granules color 0.03 parts; polyvinyl acetate. In 50% water dispersion. 0.15 parts; water up to 0.5 parts (all parts, by weight).

Finally, the material applied to the components of the building (walls, ceilings, or especially floors) may be covered by a transparent layer, for smoothing out and for wear, consisting of a suitable synthetic resin. Such a layer may be applied by means of a casting spatula-using smoothing out doctoring processes, or by other processes.

The manufacturing process of the buildings finishing and decorating material according to the invention is, of preference, continuous, the supporting net being in constant horizontal motion, and consists of the following operations:

the baiting, or the priming of the supporting net, if the latter is of textile fibers by drawing it through a bath of a thermoplastic synthetic resin, a bath of an aqueous dispersion of the resin or a solution of the resin to which is added finely ground filler of the granules material the excess of synthetic resin dispersion or solution being removed by squeezing out the supporting net;

spreading a layer of previously washed and dried hard granules on the impregnated supporting net, the layer being of a uniform thickness according to the grain size; the layer is spread by free dosed flow of the granules, immediately followed by a slight pressing of the face layer, for the purpose of setting the granules and of slightly smoothing the surface; the layer is 1–7 mm thick, which represents 1.5–2.5 times the average size of the hard granules employed;

binding the granules to each other and to the supporting net by means of pellicles resulting from spraying the granule layer with an aqueous dispersion or a solution of the thermoplastic polymer employed; the liquid is sprayed from above, under a convenient pressure, the operation being successively repeated, beginning from one edge of the strip, towards the other; it was found convenient to employ dispersions with 20–30%, preferably 25% of solid synthetic resin, or 12–23% of the resin, preferably 17% in solution; with the above concentration, the dispersion or the solution trickles down from the prominent portions of the granules in sufficient quantity to, the body of the layer of granules and to the support, so as to ensure the covering of the whole surface of the granules and their solid binding; the volume of dispersion or of solution sprayed is thus a volume which supplies a small excess beyond that which is returned by the granules layer;

drying the sprayed binder by evaporating the water from the dispersion or the solvent of the solution, by moderately heating the layer, step by step and uniformly, followed by sintering, to transforming the binder into a pellicle, and then by its slight softening; these operations are favorably performed by infrared heating from below means of infrared rays, of the foil of material to a final temperature of 80°–120°C. For this purpose, the foil of material must be borne, and not drawn, on a conveyor belt with large meshes, for instance of wire net; the water vapor being evacuated and the solvent vapour recovered;

detaching the foil of material with the binder in the form of pellicles and softened from the conveyor belt; the operation is advantageously performed by intercalating a roll of small diameter, over the conveyor belt, the roll rotating so as to contribute to the displacement of the foil of material;

pressing the hot foil with the binder softened for the purpose of reaching the final compression and increasing the adhesion of the hard granules to each other and to the supporting net as well as for calibrating the material thickness. This purpose may be easily achieved by drawing the material and letting it pass between two smooth rolls;

cooling the material to abient temperature, removing the residual water vapor or the gases of gel-formation and polymerization, still contained in the material. This cooling process may be conveniently and actively performed, on the face of the material, which lies on the supporting net, by putting this face in contact with a plane and smooth surface, water cooled, along which the foil of material may be drawn; a cold air draft is blown along the upper face of the material, in a direction opposite to the displacement of the foil, over the entire zone, which is water-cooled below;

wrapping the cooled material on cardboard rolls; rolls of 10–15 cm dia may be employed, the length of the foil wrapped on it being 5–20 m;

storing the rolls of material; it was found necessary to store the rolls in vertical position, in order to avoid tractive stress in the material in the longitudinal direction of the foil as a consequence of the plastic strain of the binder, which would result in the loss of the hard grain adhesion.

The material for finishing and decorating the buildings, according to the invention — as manufactured by means of the process and the installation described above — looks like a split natural crystalline stone, consisting of granules of the same kind and color, or differing, bound by means of a practically invisible binder of organic polymer; it has the appearance a rugged surface, the granules being prominent at different levels, as if the respective stone would have broken according to a scheme which crushes the binder and leaves untouched the granular structure of the stone. Thus the material according to the invention keeps the natural appearance of the granules unchanged, as well as their specific effect on light, possibly due to their different nature and to their situation, at different planes. The material, made with artificial granules — organic or inorganic — shows similar properties, and new optical and decorative effects.

The material according to the invention shows a resistance to wear and bad weather, corresponding to that of the natural or artificial granules employed. Applied to a building, these materials may be impermeable to water, permeable to air and water vapor, of great durability and require little maintenance. These properties render the material fit for finishing and the inner and outer decoration of any kind of construction.

The material is adequately used in the shape of a wide and long foil with sufficient flexibility as to be manipulated in rolls. The foils may be of a large diversity, according to the nature of the granules, their size, color, and geometry of arrangement. When applying it, the foil, possibly cut in to strips or plates, is applied with its back side to the components of building, such as walls, columns, ceilings, floors of plastered concrete, plastered brick masonry, wood, glass, gypsum, smooth faced stone. The foil is fixed by means of cement mortar, cement and lime, with or without additives, such as binders of synthetic resins, which may be emulsified with water.

DESCRIPTION OF THE DRAWING

In the Drawing:

FIG. 5 is a schematic side view of an installation for making the material; and

FIG. 6 is a cross section through the feeding-dosing device of the installation.

SPECIFIC DESCRIPTION AND EXAMPLE

EXAMPLE 1

Figures 1, 2:
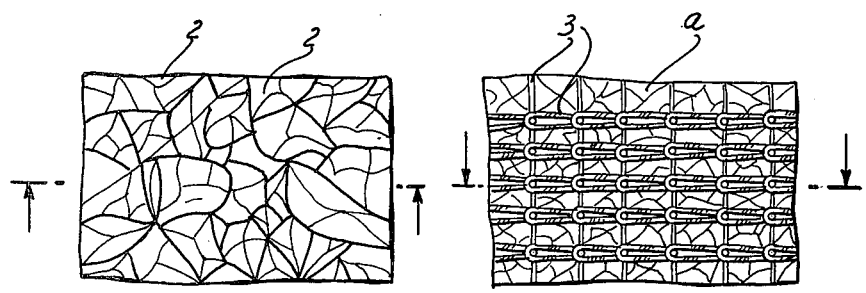
FIG. 1 is a frontal view of the material.
FIG. 2 is a back view of the material.
Figure 3:
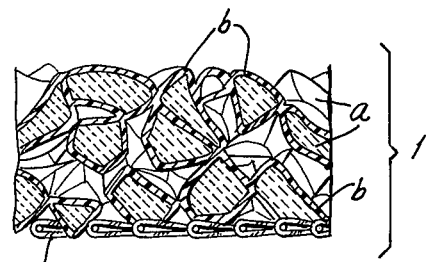
FIG. 3 is a cross section through the material, along the line A—A.

One embodiment of the invention, according to FIGS. 1–3, shows the material, consisting of: face layer 1, composed of a sheet of hard granules $a$, of white marble, broken, washed, dried and dimensionally sorted; the binder 2, a thermoplastic synthetic resin, binding the granules of the layer, by means of a film, to each other and to the supporting net 3; the pellicles of binder film $b$ are visible; the supporting net 3 employed is a cotton thread knitting, with meshes of fixed dimensions; the knitting has been impregnated; when manufacturing the material, with an acqueous dispersion, for instance of polyvinyl acetate (polymer of average viscosity, of 8,000–10,000 cP, and a value of K, equal to 70–75) fillerized with marble dust, of less than C.2 mm grain.

The layer of granules contains an average of about 2.5 layers of granules $a$, the range of sizes being narrow. Part of the granules penetrate with their corners through the meshes of the bearing net 3.

Figure 4:
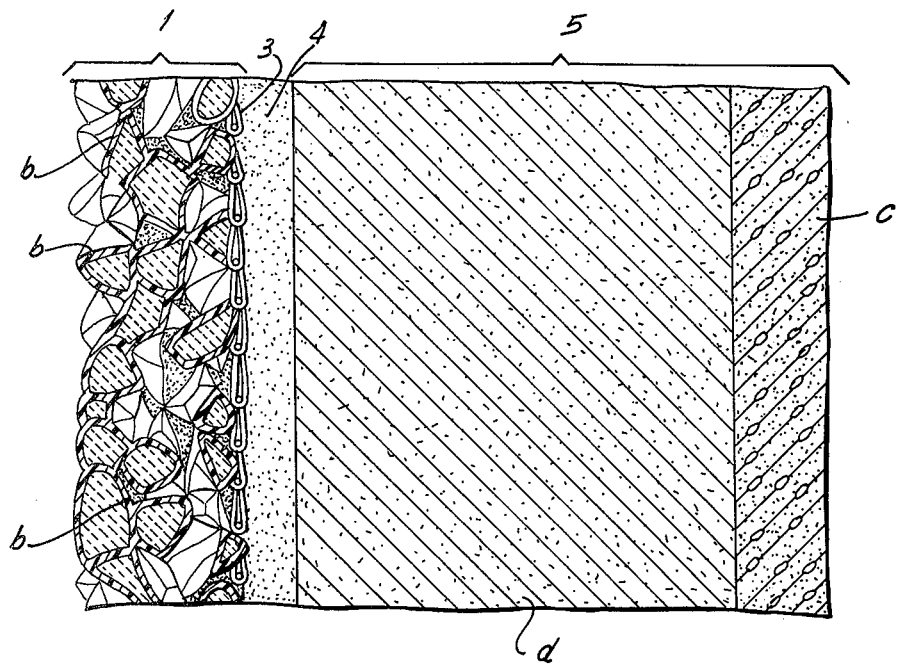
FIG. 4 is a section through the material, applied by means of a layer of adhesive mortar to a component of the building.

The material has been applied, according to FIG. 4, by means of the adhesive mortar 4, to the building component 5, for instance a reinforced concrete wall $c$, the layer of plastering being $d$, and the mortar of lime with cemenet as an additive.

The adhesive mortar 4 has been prepared according to the following recipe: cement of high initial strength, 1.5 parts; fine, dry sand, of 0–0.2 mm grain size, 2 parts; lime paste 50%, the balance consisting in: water 0.10 parts; solid calcium chloride, 0.01 parts; mineral dye, in the hard granules colour, in the present example, zinc white, 0.05 parts; polyvinyl acetate, in 50% water dispersion, 0.15 parts; water, up to 0.5 parts (all parts, expressed in weight figures). With this adhesive mortar, the material is firmly affixed to the building component.

The material is rendered water repellent, after having been applied to the building component, by spraying polyvinyl chloride and acetate solved in cyclo-hexanone, over the face layer 1.

EXAMPLE 2

The installation for manufacturing the material for building and decoration, object of this example, is a continuous working one, and may produce material with the face layer of granules of the same kind or of different kinds, of the same colour or of different colours, uniformly or non-uniformly mixed, before being applied, with the binder in acqueous dispersion or in solution, and the supporting net impregnated or non-impregnated.

In an adequate execution, the installation consists of the following parts, according to the diagrammatic sketches in FIGS. 5 and 6, while its operation is described further down:

The unreeling device 1, bearing on its shaft the supporting net roll $1_1$. The device unreels by traction and goes over the smooth roll in the baiting, or priming vat 2, which is filled with the baiting or priming liquid, maintained at a constant level (the liquid is an aqueous dispersion or solution of the polymer used, eventually with powder of the hard granules material of the face layer, as a filler); when the supporting net requires no priming, it by-passes vat 2, going directly over the small diameter guiding and squezing roll 3, of small diameter, provided with helical ribs arranged in opposite directions, from the centre towards the ends; the directions of the ribs are such, that when roll 3 rotates, it extends the supporting net laterally, and if the latter is primed squeezes out the priming liquid in excess, which is then led back to vat 2. The supporting net is then taken over by the conveyor belt 4 which drags it, at the same time exercising the tractive power, necessary for the unrolling, priming, guiding and squeezing operations, mentioned above. The conveyor belt is driven by a motor-reducer-variator set for the steples speed variation.

From the feeding-dosing device 5, continuously supplied over its whole length with hard granules, previously washed and dried, the granules are continuously distributed, transversely and simultaneously, over the whole width of the supporting net; the granules flow through the opening $5_1$, which gets continuously narrower, between the fixed plain and sloping wall $5_2$, and the cylindrically bent wall $5_3$, which may glide (in the direction shown by arrow $5_3''$) along the bent wall $5_3'$; the lower end of the wall $5_3$ is tangent to a plane, parallel to that of the conveyor belt 4, the free end of the wall $5_3$ may be driven by means of the free flap $5_4$, of horizontal axis; the position of the flap $5_4$ may be fixed; the position of the gliding wall $5_3$ and of the flap $5_4$ serve for the rough, respectively fine adjustment of slit $5_5$, and consequently of the hard granule dosing; in continuation of the gliding wall $5_3$, there is the horizontal scraper blade $5_6$, borne by the support $5_7$, both being elastically maintained by means of the springs $5_8$, which surround the bolts $5_9$. The whole device is provided for its vertical displacement, by means of the double thread bushings $5_{10}$, mounted on the legs $5_{11}$ of the device. The scraper blade $5_6$ levels the thickness of the "rough surface" granules layer distributed over the supporting net $1_1$, which later becomes the material foil $1_2$.

The device 6 sprays over the granule layer on the supporting net $1_1$, driven by conveyor belt 4, an aqueous dispersion or a solution of synthetic resins, which flows by gravity from the tank 7 provided with a stirrer, which is located above, being supplied at regular intervals with fresh liquid, from one of the monte-jus 8, by means of compressed air. The liquid is sprayed downwards atomized with compressed air, simultaneously, by the battery of nozzles $6_1$, uniformly distributed over a rectangular area, supplied individually with liquid from the tank 7, and still individually with compressed air, over flexible hoses; the battery of nozzles has an adjustable spraying output and is borne by a trolley, running on rails in both directions, transversely with respect to the strip of foil; the motion is transmitted over chain wheels and chains, by means of a motor-reducer-variator set and an automatic reversing switch.

The foil of material $1_2$, sprayed with liquid, goes over the rolls 9 in the drying tunnel 10, where it is conveyed by the conveyor belt $10_1$, made of large mesh wire net, driven by a motor-reducer-continuous speed variator set, the speed being synchronized with that of conveyor belt 4. The foil of material is heated by means of gas-fired infrared heaters $10_2$, located below, whose ranges of radiation cover the whole length and width of the strip of material within the tunnel, ensuring a step by step, moderate and uniform heating, to evaporate completely the liquid sprayed and to have the foil, when leaving the tunnel, at a temperature of 80°–120°C. The binder used is thus transformed into pellicles and slightly softened; the systeme of pipes $10_3$ evacuates the water vapor upwards to the atmosphere, and the solvent vapours to the condenser. The roll $10_4$ is located, inside the tunnel, at the exit of the foil of material, immediately above the conveyor belt $10_1$, being smooth and of small diameter, and being rotated in the direction of displacement of the foil of material, at an adjustable tangential speck, equal to that of the conveyor belt $10_1$; the roll detaches the foil of material, with the binder in the shape of a film, softened, from the conveyor belt $10_1$, the foil going between the pair of free and smooth rolls 11, to be pressed, finally compacted and its thickness gauged.

After having passed the rolls 11, the foil of material is cooled, gliding over the water cooling table 12, provided with flat box, with inner baffles and water circulation in counter-current with the foil of material, which is cooled down to the temperature of the surroiundings. The foil of material is equally air cooled, over its whole upper surface, by means of the cold air blowing opening 13, blowing tangentially, at the final end of the water cooling table 12, supplied by an air blower.

The foil of material, cooled down to the surrounding temperature, is still flexible, so as to be wound on a cardboard roll of 10–15 cm dia, placed on the shaft of the rolling device 14, driven by a motor-reducer-continuous speed variator set, which equally drags the strip of material beyond the drying tunnel 10, between the rolls 11, and on the table 12. When the desired length of the roll is reached, the strip is cut manually, and the roll replaced, equally manually.

The whole installation may be automated, the conditions being those already known, and provided with a second, spare roll, as well as with mechanical means for cutting the strip of material, incorporated into the rolling device.

It is understandable that by adequate modification of the feeding-dosing device 5 and of its annexes, as for instance by its transversal division in compartments, by dividing the gliding, cylindrically bent wall regulating the flow, in several sections, corresponding to the compartments, and the control of the respective draining, the bunker being supplied with granules of different nature and colour, materials may be obtained with layers of granules, arranged according to pre-established geometries.

The application of the invention yields the following advantages:

it supplies a material for finishing and decorating the buildings, in the shape of a flexible, continuous strip, constituting a ready finished veneer, having the aspect of a split natural crystalline stone, or similar, with a wide range of assortments, colours, patterns, of high resistance and good adhesive properties, being a prefabricated material, applicable on outer and inner walls, on ceilings and even on floors, of low cost and application expenses, as compared to the ready finished veneers or plasterings, or other similar material of ceramics, glass etc.;

the manufacturing process of the finishing and decorating material is simple, using granules of broken or natural rock, sometimes artificial granules, which are spread as a multi-layer sheet, on a supporting net, bound together and the binder dried, the binder generating pellicles of practically invisible and reduced amounts of polymer;

the manufacturing installation of the finishing and decorating material is simple, not expensive, and of high productivity, being susceptible of complete mechanization and automation.

We claim:

1. A flexible-foil material for the finishing and decoration of the surface of a building and applicable to a component thereof as an intact veneer, said material comprising a net web of yarn; a plurality of layers of crystalline split stone granules overlying said web with the granules of the least undermost layer penetrating into openings of said web, said layers including an outer layer of irregular granules and being so disposed as to prevent observation of said web from the side of the foil opposite that at which said web is provided; and a binder composed of a colorless synthetic resin selected from the group which consists of acrylic, vinylic and polyester resins coating the granules of said layers exclusively in the form of a thin film and bonding the granules together and to the web without filling of the voids between said granules and between the granules and the web whereby said films are invisible from said side of said foil, said web being composed of natural or artificial textile yarn, glass yarn or coated-metal wire with said web having an open area of at least 70% of its total area, said web having a mesh size being at most 80% of the smallest particle size of the granules, said web being primed with a thermoplastic synthetic resin including finely ground filler of the material of said granules; said granules being hard stone in a particle size range of 0.5 to 5 mm, 1.5 to 3 layers of granules being provided on the web, and an adhesive mortar bonding said foil to said surface of said component and penetrating through the web contacting said corners of said granules.

2. A flexible-foil material for finishing and the decoration of the surface of a building and applicable to a component thereof as a ready-finished veneer, with the decorative side having the appearance of split cristalline stone, said material comprising a net web of yarns having meshes; an upper covering sheet consisting of a plurality of irregular granules of natural stone, being in touch and covering one another, overlying and preventing observation of said web from the decorative side of the foil, while some granules from the lowermost layer penetrate into meshes of the net web with corners thereof; and a binder consisting of a thermoplastic colorless synthetic-resin, exclusively formed of fine films, coating the granules of said layers and binding them together as well as to the said net web, without filling the voids between said granules nor between the granules and the net web, whereby said films are invisible too from the decorative side of said foil.

3. The material defined in claim 2 wherein said granules are of hard stone and have a particle size in the range of 0.5 to 5 mm, screened relatively narrow, such as 0.5–2; 1–3 mm, or even narrower, such as 1–2; 2–3; 3–4 mm, and 1.5 to 3 layers of granules are provided on the web.

4. The material defined in claim 2 wherein said web is made out of natural or artificial textile yarns, glass yarns or coated-metal wire, has stable and equal meshes with the size of at most 80% of the smallest size of the granules used, while the open area of the meshes amounts to at least 70% of the web total area.

5. The material defined in claim 2 which, when applied to the said surface of said building component, comprises a binding-adhesive mortar of fine structure, selected among the mortars with cement, with cement and lime and possibly synthetic resin addings, which mortar adheres to the said prominent corners of said granules and penetrates through the other web meshes, adhering to the entire back side of the lowermost layer of said granules, filling said voids existing between the granules, as well as between the granules and the net web.

* * * * *